United States Patent
Padro

(10) Patent No.: US 9,175,815 B2
(45) Date of Patent: Nov. 3, 2015

(54) LIGHTED ELECTRICAL DEVICE AND RECEPTACLE

(71) Applicant: Hubbell Incorporated, Shelton, CT (US)

(72) Inventor: Kenny Padro, Hamden, CT (US)

(73) Assignee: HUBBELL INCORPORATED, Shelton, CT (US)

( * ) Notice: Subject to any disclaimer, the term of this patent is extended or adjusted under 35 U.S.C. 154(b) by 57 days.

(21) Appl. No.: 14/027,622

(22) Filed: Sep. 16, 2013

(65) Prior Publication Data

US 2014/0085922 A1    Mar. 27, 2014

Related U.S. Application Data

(60) Provisional application No. 61/704,098, filed on Sep. 21, 2012.

(51) Int. Cl.

| | |
|---|---|
| *F21K 99/00* | (2010.01) |
| *F21V 8/00* | (2006.01) |
| *F21V 33/00* | (2006.01) |
| *F21V 23/04* | (2006.01) |
| *F21S 8/00* | (2006.01) |
| *F21Y 101/02* | (2006.01) |

(52) U.S. Cl.
CPC ............... *F21K 9/52* (2013.01); *F21V 23/0464* (2013.01); *F21V 33/006* (2013.01); *G02B 6/0001* (2013.01); *F21S 8/033* (2013.01); *F21Y 2101/02* (2013.01); *G02B 6/0006* (2013.01); *G02B 6/0008* (2013.01)

(58) Field of Classification Search
CPC .... G02B 6/0001; G02B 6/001; G02B 6/0006; G02B 6/0008; G02B 6/0096; G02B 6/4298; H01R 13/717; H01R 13/175; H01R 2103/00; F21K 9/52; F21V 23/0442; F21V 33/006; F21V 23/0464; F21Y 2101/02; F21S 8/033
USPC .................. 361/42, 95; 362/45, 95, 551, 576, 362/23.09, 23.16; 307/118
See application file for complete search history.

(56) References Cited

U.S. PATENT DOCUMENTS

| | | | | |
|---|---|---|---|---|
| 2,512,975 | A * | 6/1950 | Sherrard ....................... | 200/315 |
| 6,350,039 | B1 * | 2/2002 | Lee .................................. | 362/95 |
| 6,547,411 | B1 * | 4/2003 | Dornbusch ...................... | 362/95 |
| 6,805,469 | B1 | 10/2004 | Barton | |
| 7,036,948 | B1 * | 5/2006 | Wyatt .............................. | 362/95 |
| 7,118,235 | B2 * | 10/2006 | Barton ............................ | 362/20 |
| 7,285,721 | B1 * | 10/2007 | Savicki, Jr. ..................... | 174/50 |

(Continued)

*Primary Examiner* — Anne Hines
*Assistant Examiner* — Jose M Diaz
(74) *Attorney, Agent, or Firm* — Dickinson Wright PLLC

(57) ABSTRACT

An electrical wiring device, such as a GFCI duplex receptacle, includes a light source for lighting a selected area and a photo sensor to detect ambient light conditions and to actuate a light source when the ambient light conditions are below a predetermined level. The light source is preferably at least two LEDs having an associated light conducting member functioning as a light pipe that extends between the respective LED and the front face of the electrical wiring device. Each light conducting member has an inclined face extending through an opening in the cover of the wiring device to project a light beam at an inclined angle with respect to the front face of the wiring device. The light conducting members are independently rotatably mounted in the wiring device so that the user can manually rotated the light conducting member to direct the light beam to a selected area.

26 Claims, 7 Drawing Sheets

(56) References Cited

U.S. PATENT DOCUMENTS

| | | | |
|---|---|---|---|
| 7,758,234 B1* | 7/2010 | Savicki et al. ............... 362/641 |
| 7,862,350 B2 | 1/2011 | Richter et al. |
| 7,869,171 B2* | 1/2011 | Weeks et al. .................... 361/42 |
| 7,918,667 B1* | 4/2011 | Shim ............................... 439/39 |
| 8,083,376 B2* | 12/2011 | Chien ........................... 362/276 |
| 8,194,368 B2 | 6/2012 | Weeks et al. |
| 2004/0218379 A1* | 11/2004 | Barton ............................ 362/95 |
| 2005/0252753 A1* | 11/2005 | Leo ............................ 200/51.11 |
| 2007/0171625 A1* | 7/2007 | Glazner .......................... 362/95 |
| 2007/0251712 A1* | 11/2007 | Berg et al. ...................... 174/53 |
| 2007/0291469 A1* | 12/2007 | Chen ............................... 362/95 |
| 2008/0073117 A1* | 3/2008 | Misener ........................ 174/535 |
| 2008/0233780 A1* | 9/2008 | Waters et al. ................. 439/214 |
| 2009/0032278 A1* | 2/2009 | Weeks et al. .................... 174/53 |
| 2009/0052162 A1* | 2/2009 | Richter et al. ................... 362/95 |
| 2009/0103329 A1* | 4/2009 | Wu et al. ....................... 362/642 |
| 2009/0109653 A1* | 4/2009 | Wu et al. ......................... 362/95 |
| 2010/0277892 A1* | 11/2010 | Konopelko et al. ............. 362/95 |
| 2011/0031881 A1* | 2/2011 | Shim ............................... 315/32 |
| 2011/0228552 A1* | 9/2011 | Kevelos et al. ............... 362/558 |
| 2012/0039086 A1* | 2/2012 | Jansen et al. .................. 362/551 |
| 2012/0106202 A1* | 5/2012 | Chien ........................... 362/641 |
| 2012/0127708 A1* | 5/2012 | Chien ........................... 362/234 |
| 2012/0170292 A1* | 7/2012 | Bhosale et al. ............... 362/415 |
| 2012/0262006 A1* | 10/2012 | Elberbaum ................... 307/112 |
| 2013/0183043 A1* | 7/2013 | Elberbaum ................... 398/115 |

* cited by examiner

LIGHTED ELECTRICAL DEVICE AND RECEPTACLE

CROSS-REFERENCE TO RELATED APPLICATION

This application claims priority to U.S. Provisional Application No. 61/704,098 filed Sep. 21, 2012, which is hereby incorporated by reference in its entirety.

FIELD OF THE INVENTION

The present invention is directed to a lighted electrical device and receptacle for projecting light to a target area. The invention is particularly directed to a lighted duplex receptacle having at least one light source that can be adjusted by the user to direct the light to a selected area and in a selected direction with respect to the receptacle to illuminate an area.

BACKGROUND OF THE INVENTION

Various nightlights have been proposed and commonly used for providing low-level illumination of areas sufficient to enable a user to walk or move safely about an area. Nightlights are commonly used in bathrooms, and particularly hotel bathrooms, to illuminate the area, such as a floor, for people unfamiliar with the surroundings.

Lights have also been incorporated into electrical receptacles as indicators and to identify the location of the receptacle at low ambient light levels. These devices generally provide sufficient light to locate the electrical receptacle but do not provide sufficient light to illuminate the area around the electrical device.

One example of an electrical device having a light incorporated in the electrical device is disclosed in U.S. Pat. No. 7,862,350 to Richter et al. This patent discloses a receptacle having a light along at least one side edge as shown in FIGS. 1 and 8. A duplex electrical device is disclosed having a light in the housing and a translucent cover coupled to the front face that is flush with the front face and adjacent the duplex user-accessible interface. The cover is disclosed as extending along the front face between each of the electrical components and between the apertures. Other embodiments include an electrical device having a translucent cover over a light where the cover extends along at least ¼ the length of the front face. Another embodiment discloses an electrical device having two translucent covers extending adjacent the buttons of each GFCI where each cover extends over the light source and the light sensor. This patent further discloses an electrical device having a housing in the form of a single gang electrical enclosure, at least one additional housing and at least one additional electrical component in the additional housing.

U.S. Patent Publication No. 2012/0039086 to Jansen et al. discloses a GFCI receptacle having a nightlight. An electrical device has a light source to direct a peak radiation pattern along an axis and a light pipe having an angled surface. The light pipe is a lens that extends along the side edge of the receptacle as shown in FIG. 1C and has an angled surface that reflects the light through the front face as shown in FIG. 15.

U.S. Pat. No. 6,805,469 to Barton discloses an electrical device such as a switch or receptacle having a light source. The device has a power sensing and control means. This patent also discloses a method of providing safety lighting by concealing the lighting device. The method includes the steps of combining a light source with a conventional wiring device, controlling the on-off state and conveying light from the light source through a visible surface area of the wiring device by a lens or transparent material and where the device is concealed behind a standard cover plate.

U.S. Pat. No. 7,118,235 to Barton is a continuation-in-part of the '469 patent and discloses a lighting device having a housing with an electrical device, a light source to emit light through a visible surface of the housing and protruding through the cover plate, and a power-signal means to adjust the power level to energize the light source. The housing can have a surface area visible through a conventional cover plate window, a light source visible through the surface area, a power supply and a signal means to activate the signal means by a predetermined condition. A nightlight function is controlled by a light sensor.

U.S. Pat. No. 8,194,368 to Weeks et al. is related to U.S. Pat. No. 6,989,489 to Savicki. This patent relates to a GFCI device with a center light having a protective assembly to prevent AC power from being accessed and a light assembly covering a substantial portion of the width.

While the prior devices have generally been suitable for their intended purpose, there is a continuing need in the industry for improved lighting devices and electrical receptacles. The disclosures of U.S. Pat. Nos. 6,805,469; 7,118,235; and 7,862,350 and Publication No. 2012/0039086 are hereby incorporated by reference in their entireties.

SUMMARY OF THE INVENTION

The invention is directed to an electrical wiring device having a light source and a light conducting member that can be adjusted and positioned to direct light in a selected direction to illuminate a selected area. The wiring device can be a night light, duplex receptacle, GFCI receptacle, arc fault circuit interrupter, switch or other electrical device where there is a need to illuminate an area in the vicinity of the device. The light source is preferably provided from one or more LEDs mounted within a housing of the device that produces light of a sufficient intensity and brightness to illuminate a target area.

Accordingly one aspect of the invention is to provide an electrical wiring device having a directional light assembly for directing light in a selected direction to illuminate a selected area. Preferably the light can be manually adjusted by the user without the need for special tools after installation to direct and focus the light beam to the selected area.

Another feature of the invention is to provide an electrical wiring device having a light source where the light beam can be selectively aimed and directed to illuminate a selected target area. In one preferred embodiment the electrical wiring device has a plurality of light sources where the light beam from each of the light sources can be aimed independently from each other.

A further feature of the invention is to provide an electrical wiring device having at least one light source and a photo sensor to actuate the at least one light source when the ambient light is below a threshold level. The actuator can be a photo sensor, manually operated switch, motion sensor or occupancy sensor.

In one embodiment of the invention, the electrical wiring device is a duplex receptacle, ground fault circuit interrupter receptacle or arc fault circuit interrupter having at least one light source and a photo sensor to actuate the light source when the ambient light is below a threshold level. Each light source is configured to be adjustable to selectively direct the light to illuminate a selected area after installation of the device.

The electrical wiring device in one embodiment of the invention has at least one and preferably at least two light sources having an adjustable light conducting member for projecting light from the device that is able to direct and focus the light to a selected target area. Each of the light conducting members are independently adjustable to direct light from each of the light sources to a selected target area or to the same target area relative to the electrical wiring device.

The electrical wiring device in one embodiment has a light source and a rotatable light conducting member for directing light to a target area. The outer end of the light conducting member has a light projecting face that is inclined with respect to a longitudinal axis of the light conducting member and inclined to the front face of the housing to direct the light from the front face of the housing at an inclined angle to a target area. The light conducting members are attached to be rotatable with respect to the housing and rotatable about the longitudinal axis to direct the light in a selected direction.

The electrical wiring device of the invention has a cover that is coupled to a base of the housing where the cover has an opening for a photo sensor and an opening for the light assembly that is spaced from the photo sensor a distance sufficient to avoid interference between the light source and the photo sensor. The photo sensor has a light pipe extending to the front face of the cover for conducting ambient light to the photo sensor. The light source can have a light conducting member forming a light pipe or lens that is coupled directly to the cover to project light in a selected direction. The light conducting member functions as a light pipe extending between the light source and the front face of the cover. In a preferred embodiment the light conducting member is coupled directly to the cover and movable with respect to the cover to orient and aim the light beam in a selected direction. Preferably the light conducting member is rotatable about an axis substantially perpendicular to the plane of the front face of the cover.

The various aspects of the invention are basically attained by providing an electrical receptacle having a housing with a front face and an internal cavity where the housing has a mounting member for mounting to an electrical box. A light source is mounted in the cavity. A rotatable light conducting member with an outer face extends through the front face of the cover where the light conducting member is associated with the light source to project a light beam from the front face of the cover and housing in a selected direction by rotational adjustment of the light conducting member relative to the cover and the housing.

The various aspects of the invention are further attained by providing a housing having a front face and an inner cavity where the housing has a mounting member for mounting the housing to an electrical box. A light source is mounted within the cavity of the housing. At least one light conducting member extends between the light source and the front face of the housing to direct light from the light source in a selected direction where the position and orientation of the light conducting member is adjustable to direct the light beam in a selected direction.

The objects and advantages of the invention are further attained by providing a housing enclosing a printed circuit board, a photo sensor for sensing ambient light and a light source activated by a signal from the photo sensor when ambient light is below a threshold level. A cover having a plurality of plug blade openings is coupled to the housing. At least one light conducting member is coupled to the cover for projecting light from the at least one light source in a predetermined direction with respect to the housing. The light conducting member is movable with respect to the cover to direct light in a selected direction with respect to the cover and the housing.

A light conducting member, such as a light pipe is coupled to the cover of the housing and extends through an aperture in the cover. A top end face of the light pipe extends above the top surface of the cover and has a top face forming a lens for projecting a beam of light in a selected direction with respect to the longitudinal axis of the light conducting member and the front face of the cover. The top end face of the light conducting member can have an inclined surface for directing a light beam at an angle with respect to the longitudinal axis of the light conducting member. The light conducting member can be manually rotated by the user to direct the beam of light in a selected direction. In one embodiment, at least two LEDs with a corresponding light conducting member are provided where each light conducting member can be independently rotated to direct each beam of light in a selected direction.

These and other aspects, objects and salient features of the invention will become apparent from the following detailed description of the invention, which in conjunction with the annexed drawings discloses various embodiments of the invention.

BRIEF DESCRIPTION OF THE DRAWINGS

The following is a brief description of the drawings, in which.

DETAILED DESCRIPTION OF THE INVENTION

Figure 1:
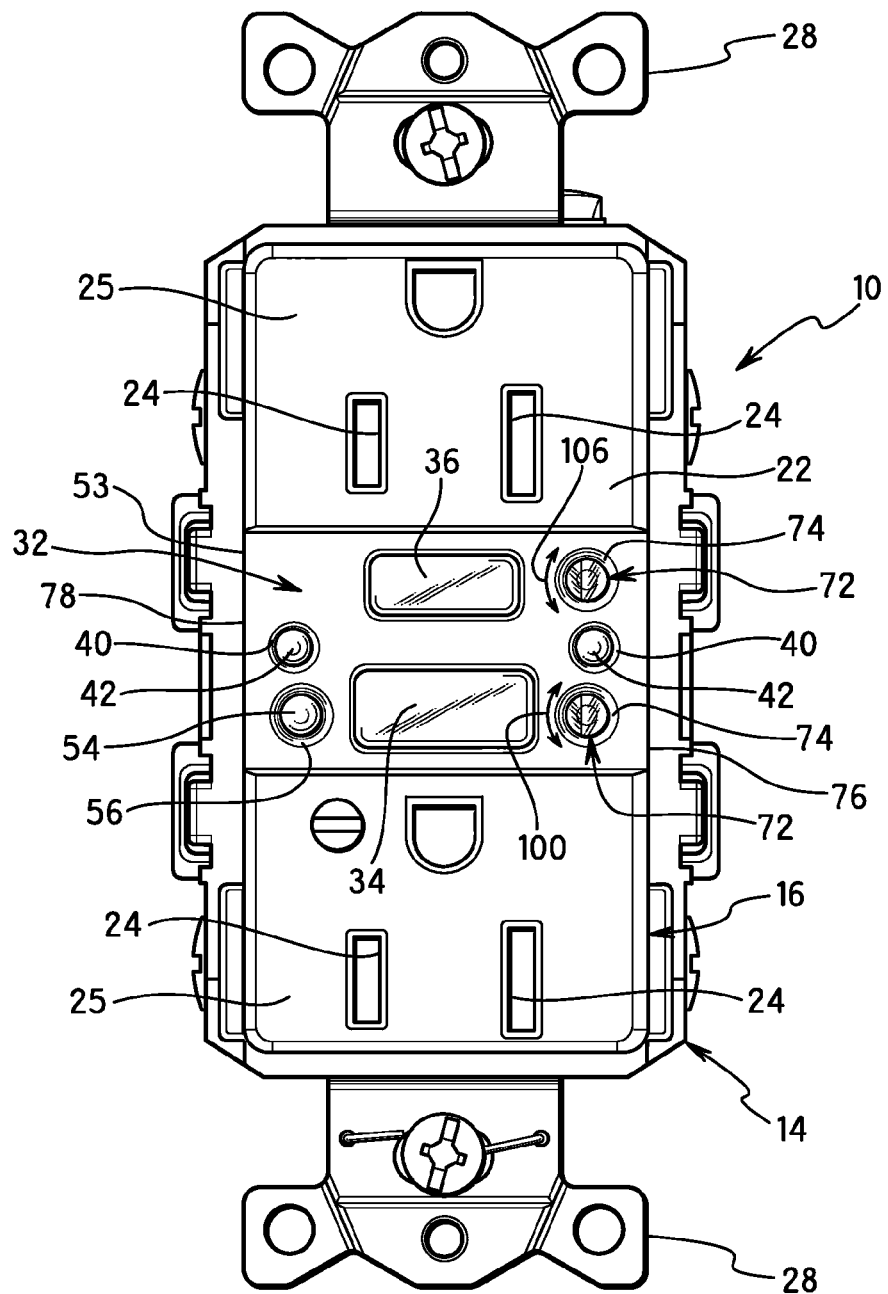
FIG. 1 is an elevational view of the electrical receptacle of the invention.

The present invention is directed to an electrical wiring device having a light source for projecting light to a selected target area. The invention is particularly directed to an electrical wiring device having an adjustable light conducting and light emitting member that can be positioned by the user to direct light to a selected target area after installation of the wiring device.

The electrical wiring device of the invention in one embodiment is an electrical receptacle such as a duplex receptacle having a ground fault circuit interrupter (GFCI). The GFCI receptacles are commonly used in bathrooms, kitchens and other wet locations. The duplex receptacle of the invention has a directional light that can be adjusted and oriented by the user to direct the light to a selected area or location to illuminate the area. The light source in preferred embodiments is an LED with a movable lens, light pipe or other light conducting member that is able to project the light to a wall, floor or other surface to be illuminated. Preferably the LED is activated by a photo sensor detecting ambient light. Alternatively, the LED can be activated by a manual switch, motion sensor or occupancy sensor.

In one embodiment of the invention, the wiring device is a duplex receptacle which can include a suitable GFCI circuit and/or arc fault circuit interrupter. Referring to the drawings, the wiring device 10 is shown as a GFCI duplex receptacle having a housing 12 defined by a base 14 and a cover 16 coupled to the base 14 to enclose the electrical components within the internal cavity 20 of the housing 12. The cover 14 as shown is a decorator style having a flat front face and a substantially rectangular shape for fitting within the rectangular opening in a face plate 18 shown in FIG. 10. The cover 16 is snapped onto the base 14 by standard coupling members as known in the art. The electrical wiring device 10 in one embodiment is shown and described as a GFCI duplex receptacle although it will be understood that the invention is not limited to GFCI receptacles and that the lighting features of the invention are suitable for other electrical devices including for example a nightlight. The wiring device 10 preferably has standard dimensions for mounting in an electrical box and includes conventional electrical contacts and electrical connectors for connecting to a power source.

Referring to FIG. 1, the cover 14 has a front face 22 with a plurality of blade apertures 24 or slots for receiving the plug and accessing the electrical contacts below or within the shutter mechanism 26 within the housing. The shutter mechanism 26 can be a conventional tamper-resistant shutter mechanism to block the openings in the device until a plug blade is inserted through the openings in the cover. The front face 22 in the embodiment shown has a substantially flat planar configuration. A mounting member 28 shown as a mounting strap is connected to opposite longitudinal ends of the housing 12 for mounting the electrical device 10 in the open end of an electrical box (not shown) in a conventional manner.

Each set of blade apertures 24 for receiving a plug is provided at the longitudinal end portion 25 of the cover 14 and the housing to define a central portion 32 on the front face 22 of the housing 12 and the cover 16 between the two sets of blade apertures 24. In the embodiment shown, the central portion 32 is recessed with respect to the end portions 25. The central portion 32 between the blade apertures 24 has a substantially planar surface with openings for a test button 34 and a reset button 36 of the GFCI circuit 38. Preferably the central portion 32 is located so that the plugs when connected to the sets of blade apertures 24 do not overlie the central portion 32 to block light from the light source. The cover 16 is also provided with openings 40 for indicator light pipes 42 which are operatively connected to indicator lights on the printed circuit board 44 to indicate the proper operation of the GFCI as shown in FIG. 1.

An indicator light is provided on one side of the cover 22 and circuit board 44 to indicate power is supplied to the receptacle and an indicator light is provided on the opposite side to indicate the GFCI circuit is tripped. The indicator lights are connected to the electrical circuitry of the GFCI to provide a visual indication to the user of the operating status of the GFCI circuit. The light pipes 42 extend from the respective indicator lights to the front face 22 of the cover 14. In the embodiment shown, the light pipes 42 have a rounded top face that is oriented substantially flush with the front face of the cover so that the light projected by the light pipes can be observed by the user.

Figure 2:
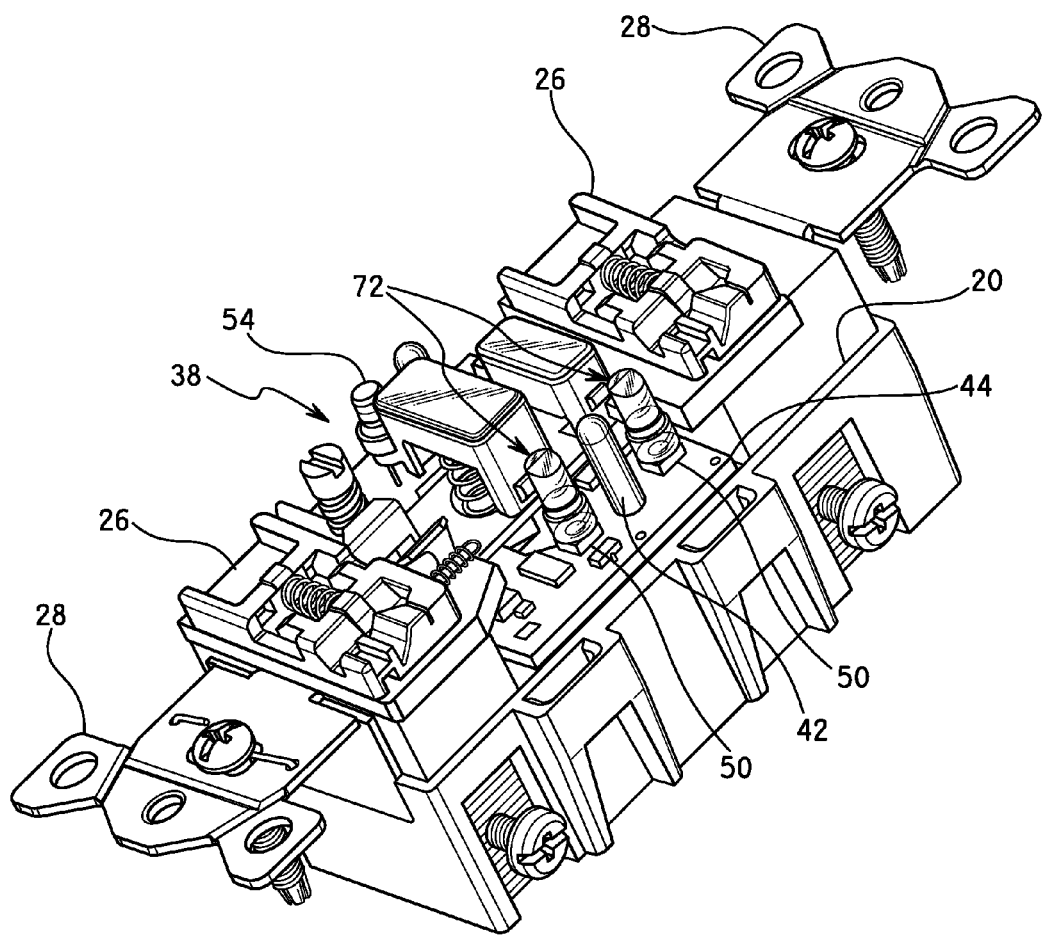
FIG. 2 is a perspective view of the electrical receptacle with the cover removed.
Figure 3:
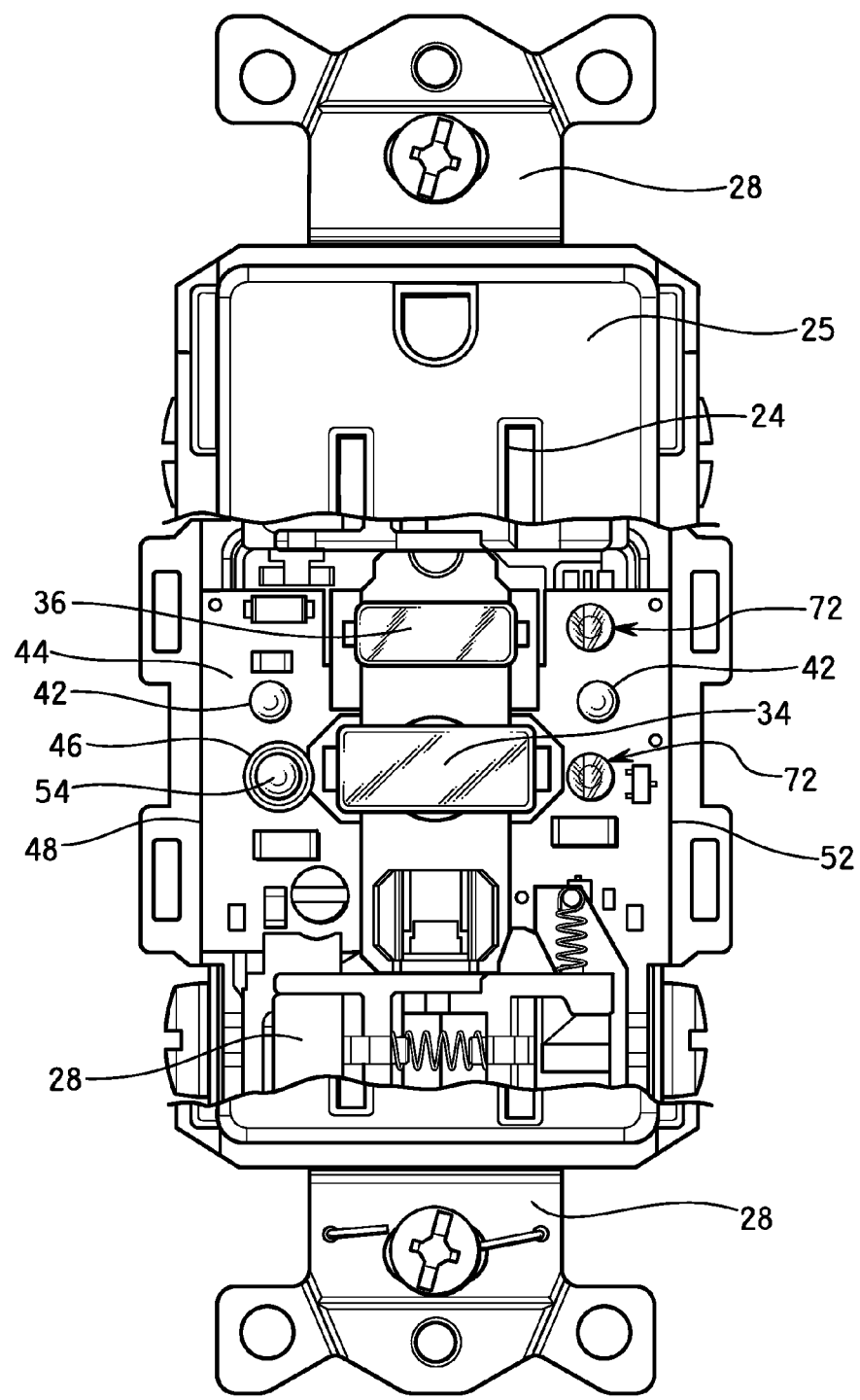
FIG. 3 is a front view of the electrical receptacle with the cover partially cutaway.

The electrical components of the GFCI circuit 38 as shown in FIG. 2 and FIG. 3 include the printed circuit board 44 that is mounted within the internal cavity 20 of the housing 12. In the embodiment shown in FIG. 2, the printed circuit board 44 is attached to the base 14 in a central portion of the base below the central portion 32 of the cover 16 and between the electrical contacts and the shutter mechanisms 26. The circuit board 44 includes suitable circuitry to operate the GFCI as known in the art. In the embodiment shown, the test button 34, reset button 36 and indicator lights 42 are mounted on or above the circuit board 44 and extend outwardly through the respective openings in the front face 22 of the cover 14.

A photo sensor 46, light sensor or photo cell is coupled to the circuit board 44 on a first side 48 and at least one and preferably two light sources shown as LEDs 50 are mounted on a second side 52 opposite the first side 48. The photo sensor 46 can be a known photo cell or sensor capable of measuring ambient light and actuating the light source when the ambient light is below a predetermined threshold level. As shown in FIG. 1 and FIG. 2 the photo sensor 46 is positioned along the side edge 48 of the circuit board 44 and along a longitudinal side edge 53 of the front face 22 of the central portion 32 and between the two sets of the blade apertures 24. Preferably the photo sensor 46 is spaced outwardly from the test button 34 and reset button 36 toward the side edge 53 of the cover 16 and outwardly from the blade apertures 24.

In preferred embodiments of the invention, the light sources are two LEDs mounted directly to the circuit board 44 although other light sources can be used. Preferably two LEDs 50 are mounted on the same side of the circuit board 44 and opposite the photo sensor 46 so that the light from the LEDs 50 does not interfere with the photo sensor 46 to reduce the risk of a possible false indicator of the ambient light level. The photo sensor 46 measures the ambient light level in the area of use and is operatively connected to the circuit board 44 and the LEDs 50 to actuate and illuminate the LEDs 50 when the ambient light level is below a threshold level.

A light conducting member 54 functioning as a light pipe is provided to direct the ambient light to the photo sensor 46. In one embodiment, the light conducting member 54 is coupled to the cover 16 so that the light conducting member 54 extends through an opening 56 in the cover 16. In the embodiment shown, the light conducting member 54 has a substantially cylindrical shape extending between the photo sensor 46 and the front face 22 of the cover 16. The light conducting member 54 has a longitudinal length so that the flat top face 58 is substantially flush with the front face 22 of the cover 16. Alternatively the top face 58 can be positioned a slight distance outward from the front face 22 or can be recessed with respect to the front face 22. The opening 56 for the light conducting member 54 has a frustoconical shaped surface at the front face 22 to form a beveled edge and a conical shaped recess 60 around the top edge of the light conducting member 54 to enable ambient light to enter the light conducting member 54 through the top face 58 and the upper side surface 62 of the light conducting member 54.

Figure 6:
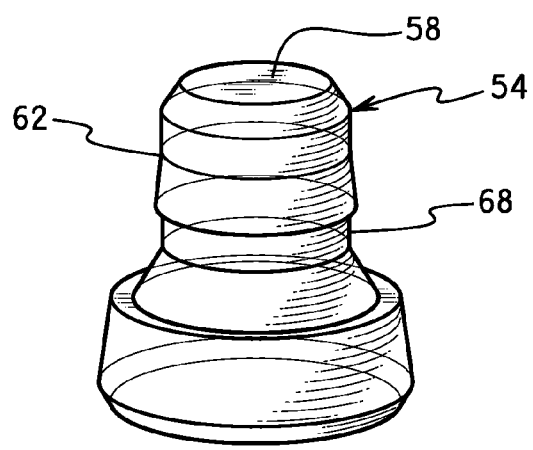
FIG. 6 is a perspective view of the photo sensor and light conducting member of the electrical receptacle.
Figure 7:
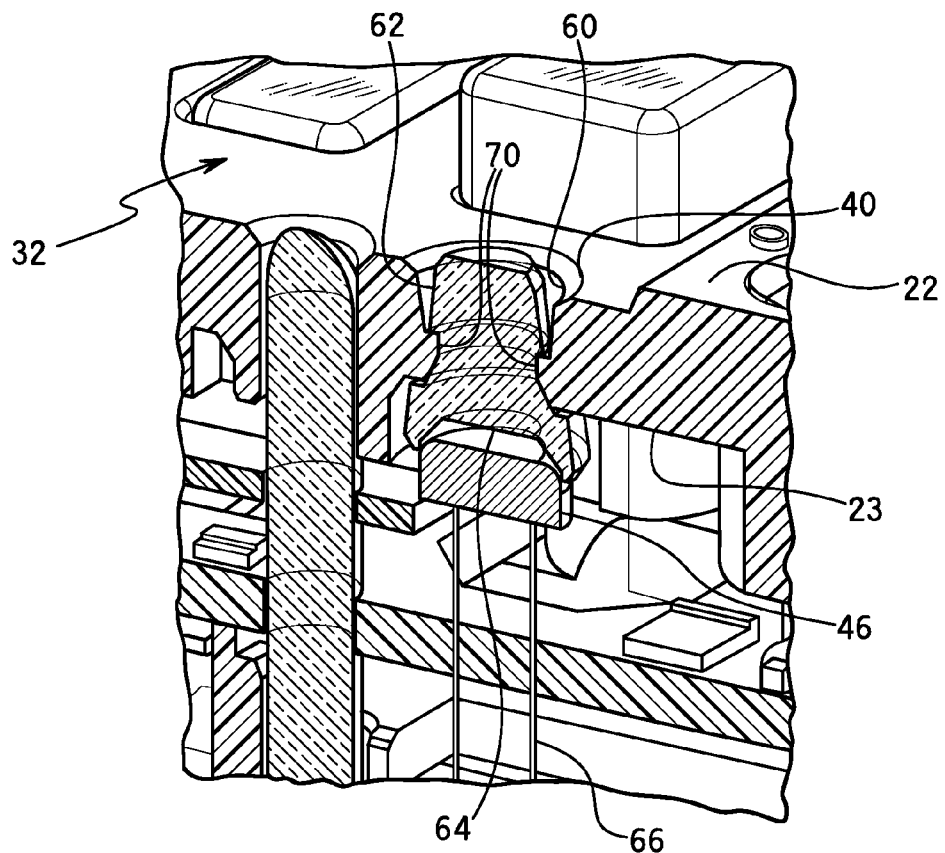
FIG. 7 is a cross-sectional view of the photo sensor and light conducting members captured in the cover of the receptacle.

In the embodiment shown in FIG. 6 and FIG. 7, the light conducting member 54 has a bottom end with a concave bottom surface 64 forming a recess opposite the top face 58. The concave bottom surface 64 is positioned directly above the photo sensor 46 as shown in FIG. 7. The concave bottom surface 64 of the light conducting member 54 is positioned sufficiently close to the photo sensor 46 to transmit ambient light from the area around the wiring device 10 to the photo sensor 46. The photo sensor 46 includes wires 66 connected to the circuit board 44 or other electrical controls to actuate the LEDs 50.

The cylindrical side surface of the light conducting member 54 has an annular recess 68. The inner surface of the opening 56 and the cover 16 has a detent 70 shown as an annular rib extending radially inwardly with respect to the opening 56 for cooperating with the annular recess 68 of the light conducting member 54 to capture and couple the light conducting member 54 to the cover 16. The detent 70 is received in the recess as shown in FIG. 7 by inserting the light conducting member 54 into the opening 56 from the bottom side of the cover 16. As shown in FIG. 7, the bottom edge of the opening 56 has an angled surface forming a beveled to guide the light conducting member 54 and slide over the detent 70 to snap into the opening 56.

Figure 4:
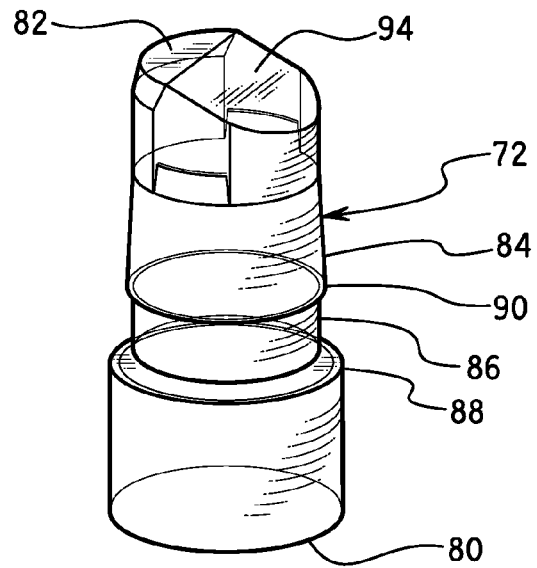
FIG. 4 is a perspective view of the light transmitting member for an LED.
Figure 5:
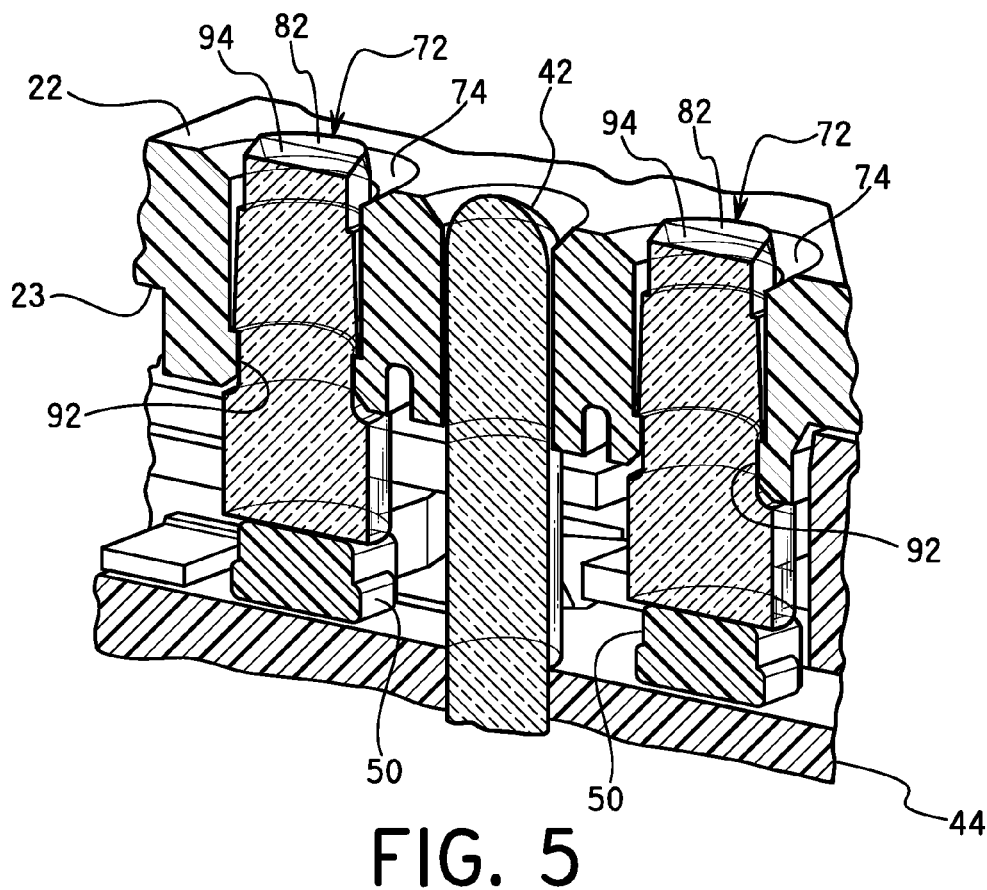
FIG. 5 is a cross-sectional view of the light transmitting member of the LED rotatably coupled to the cover of the electrical receptacle.

Each of the LEDs 50 is provided with a light conducting member 72 to project the light from the LED in a selected direction as shown in FIGS. 4 and 5. The light conducting members 72 define a light transmitting member for emitting a light beam from the end of the light conducting members 72 to a target area. The cover 16 includes openings 74 extending between the front face 22 and the rear inner face 23 for receiving the light conducting members 72 to enable the light conducting members 72 to extend through the front face 22 of the cover 16 and rotate within the opening 74. In the embodiment shown in FIG. 1, the two light conducting members 72 are provided in the central portion 32 on one side of the test button 34 and reset button 36 and along a side edge 76 of the cover 14. In one embodiment, the light conducting members 72 are spaced outwardly from the blade apertures 24 toward the side edge 76. In other embodiments, the light conducting members 72 can be positioned on opposite sides of the buttons and central portion 32. It is generally preferred to have the light conducting members 72 on the same side 76 of the housing and cover 16 and the photo sensor on an opposite side 78 to avoid interference and reduce the possibility of false indications of the ambient light level. In other embodiments the light conducting members can be positioned in other suitable locations on the front face of the electrical wiring device.

Referring to FIG. 4, each light conducting member 72 has a substantially cylindrical shape with a longitudinal axis extending between a bottom inner face 80 and a top outer face 82. In the embodiment shown in FIGS. 8 and 9, the bottom inner face 80 is substantially flat and is positioned directly above the respective LED 50 to receive light from the LED and transmit the light along the longitudinal axis to the top outer face 82 where the light is projected outwardly. The light conducting members 72 define a light pipe and light transmitting member for carrying the light from the LED and projecting a light beam outwardly from the wiring device 10 in a predetermined direction.

Figure 8:
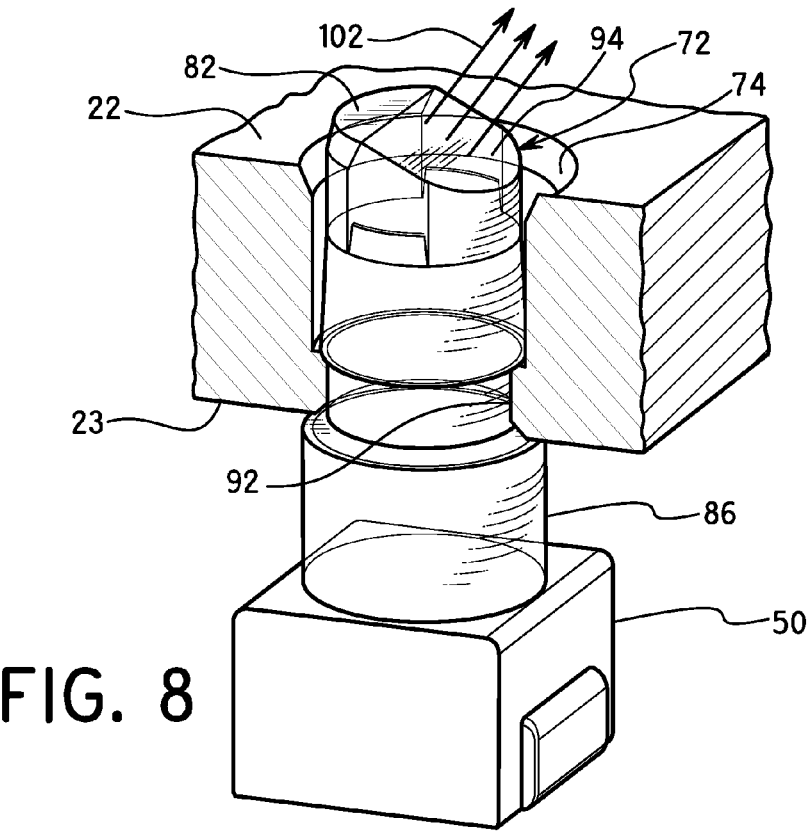
FIG. 8 is partial perspective view showing the light conducting and transmitting member rotatably coupled to the cover.
Figure 9:
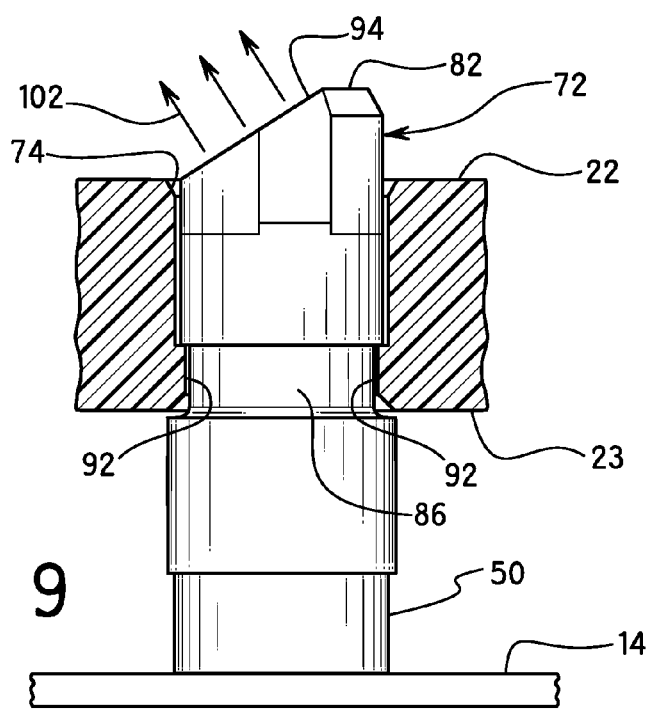
FIG. 9 is a side view of the light transmitting member and LED showing the light conducting transmitting member rotatably coupled to the cover.

The side surface 84 of the light conducting member 72 includes an annular recess 86 forming a bottom edge 88 and a top edge 90. As shown in FIGS. 5, 8 and 9 the opening 74 in the cover 16 has an inwardly extending detent 92 that is received within the annular recess 86 between the bottom edge 88 and the top edge 90 to attach the light conducting member 72 to the cover 16. In the embodiment shown the detent 92 is a continuous annular rib extending radially inwardly from the side wall of the opening 74 to engage the annular recess 86 of the light conducting member 72. The light conducting member 72 is mounted to the cover 16 for rotational adjustment with respect to the cover 16 as indicated by arrows 100 in FIG. 1. The light conducting member 72 can be manually rotated about the longitudinal axis to direct the light emitted from the light conducting member in a selected direction. Preferably each of the light conducting members rotates independently of the other.

The outer top end of the light conducting member 72 has an inclined face 94 forming a light projecting surface that is oriented at an incline with respect to the longitudinal axis of the light conducting member and at an incline with respect to the plane of the cover 16 as shown in FIG. 9 to project a light in a direction outwardly from the plane of the inclined top face 94 as indicated by arrows 102 in FIGS. 8 and 9. In the embodiment shown, the light is projected from the light conducting member 72 substantially perpendicular to the plane of the inclined face 94. The top outer face 82 is a minor surface area relative to the surface area of the inclined face 94 and is oriented substantially perpendicular to the longitudinal axis of the light conducting member and parallel to the plane of the front face 22.

The inclined face 94 in the embodiment shown is oriented at an acute angle of about 30° with respect to the front face 22 of the cover and at an angle of about 60° with respect to the longitudinal axis of the light conducting member 74. The angle of the inclined face 94 can be selected depending on the desired projecting angle of the light beam and the shape of the face 94. The light conducting member 72 functions is a light pipe to direct the light from the LED 50 outwardly from the front face 22 of the cover 16 at an inclined angle with respect to the front face 22. The inclined face 94 is shown as being substantially flat. In alternative embodiments, the inclined face can be curved to form a convex surface to define lens for focusing the light or a concave surface. In further embodiments, the outer face of the light conducting members 72 can have other suitable shapes with one or more surfaces capable of projecting a beam of light in a selected direction so that adjusting the position of the light conducting members enable focusing the light beam to a selected target area.

The opening 74 for the light conducting member 72 has a top end with an inclined surface 96 forming a conical shaped recess adjacent the front face 22 surrounding the light conducting member 72. The top face 82 of the light conducting member 72 in one embodiment shown in FIG. 5 extends a slight distance above the front face 22 a distance to enable the light to be projected away from the front face 22 and to allow the user to manually grip the top end and manually rotate the light conducting member 72 to orient the inclined surface 96 in a selected direction thereby projecting the light beam to a desired target area.

Figure 10:
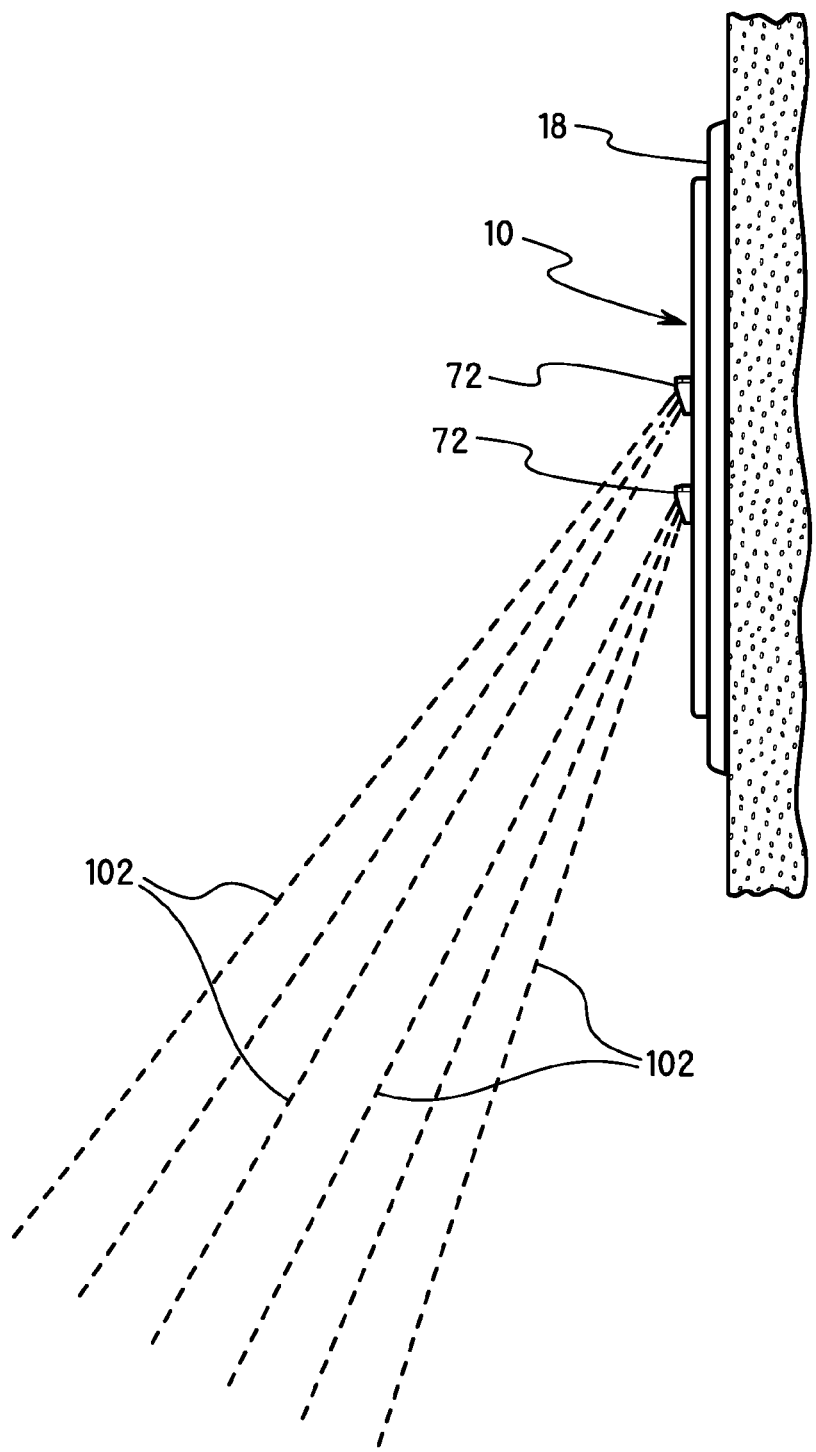
FIG. 10 is a side view showing the light from the receptacle projected toward a surface to be illuminated.

During use, the device 10 is mounted in a standard electrical box and coupled to the power source to provide electrical power to the electrical contacts and components of the device. The photo sensor detects the ambient light levels and produces a signal to actuate the LEDs 50 when the light level is below a predetermined level. The user is able to rotate each of the light conducting members 72 of the light emitting assembly independently of each other to position the outer face in a desired orientation, thereby projecting light from each light conducting member 72 in a selected direction to illuminate a selected target area. Each of the light conducting members is independently adjustable to direct the light in selected patterns or areas as depicted in FIG. 10. For example, the device can be mounted on a wall as shown in FIG. 10 so that the light conducting members can be oriented to direct a light beam 104 downwardly toward the floor or to one side toward a doorway. The LEDs 50 and the light conducting members 72 are able to project a light beam with sufficient brightness and intensity to illuminate a target area.

While various embodiments have been selected to illustrate the invention, it will be understood by those skilled in the art that various changes and modifications may be made without departing from the scope of the invention.

What is claimed is:

1. An electrical wiring device comprising:
a housing having a base supporting a photo sensor for sensing ambient light and at least one light source activated by a signal from said photo sensor when the ambient light is below a predetermined level;
a cover coupled to said housing and having a first opening associated with said photo sensor and a second opening associated with said at least one light source; and
at least one light conducting member coupled to said cover and extending through said second opening in said cover for emitting and projecting light from said at least one light source in a predetermined direction with respect to said light conducting member and said cover, said light conducting member being movable with respect to said cover to direct light in a selected direction at an inclined angle outwardly and away from said housing to illuminate a target area with respect to said housing.

2. The electrical wiring device of claim 1, wherein said at least one light conducting member has a longitudinal axis and an outer face formed at an incline with respect to said longitudinal axis for directing light from said light conducting member at said incline away from said housing.

3. The electrical wiring device of claim 2, wherein said light conducting member is rotatable with respect to said cover about said longitudinal axis.

4. The electrical wiring device of claim 3, wherein said light conducting member has an annular recess and said cover has at least one detent received in said annular recess to permit rotation of said light conducting member with respect to said cover.

5. The electrical wiring device of claim 1, wherein said light conducting member is a light pipe having a first end positioned to receive light from said light source and a second end extending from a top surface of said cover and where said light conducting member is rotatably adjustable with respect to said housing.

6. The electrical wiring device of claim 1, wherein said light conducting member is coupled to a rear face of said cover, and extends through said second opening in said cover.

7. The electrical wiring device of claim 6, wherein said light conducting member has an outer end projecting from a front face of said cover.

8. The electrical wiring device of claim 1, further comprising
at least two of said light conducting member where each of said light conducting members are independently adjustable with respect to said cover, and positioned on a first side of said housing opposite a second side of said housing supporting said photo sensor.

9. The electrical wiring device of claim 8, wherein each of said light conducting members has an outer face formed at an incline with respect to a front face of said cover for projecting light outwardly and away from said cover and being independently rotatable with respect to said cover.

10. The electrical wiring device of claim 1, wherein said electrical wiring device is an electrical receptacle selected from the group consisting of a duplex electrical, a ground fault circuit interrupter, and an arc fault circuit interrupter.

11. An electrical wiring device comprising:
a housing having a front face and an internal cavity, said housing having a mounting member for mounting the electrical wiring device in an electrical box;
a first light source and a second light source mounted in said housing and connected to a power source; and
a first movable light conducting member having an outer face extending through a first opening in said front face of said housing and a second movable light conducting member having an outer face extending through a second opening in said front face of said housing, each of said light conducting members being associated with a respective light source to project a light beam outwardly and away from said front face in a selected direction to illuminate a selected target area by adjusting the position of said light conducting members with respect to said front face of said housing.

12. The electrical wiring device of claim 11, wherein said first light source is a first LED and said second light source is a second LED.

13. The electrical wiring device of claim 11, wherein each of said light conducting members is a light pipe having an inner end associated with and receiving light from the respective light source, said outer face of each of said light conducting members being formed at an incline with respect to a longitudinal axis of said light conducting member for directing the light beam outwardly and away from the housing at an incline with respect to the front face of said housing.

14. The electrical wiring device of claim 13, wherein each said light conducting member is rotatable about an axis substantially perpendicular to a plane of said front face of said housing.

15. The electrical wiring device of claim 11, wherein said electrical wiring device is a ground fault circuit interrupter receptacle having a test button and a reset button, and where said light conducting member is positioned between said test button and said reset button and a first side of said front face of said housing.

16. The electrical wiring device of claim 11, wherein each of said light conducting members is positioned on a first side of said front face, said electrical wiring device further comprising;
a photo sensor for sensing an ambient light level and connected to each of said light sources for actuating each of said light sources when an ambient light level is below a threshold level, and where said photo sensor is positioned on a second side of said front face of said housing.

17. The electrical wiring device of claim 11, wherein said housing comprises a base and a cover, and said light conducting member is received in an opening in said cover and rotatably mounted in said cover about an axis substantially perpendicular to a plane of said front face.

18. The electrical wiring device of claim 17, wherein each said light conducting member has a side surface with an annular recess, and said cover has a detent extending inwardly from a side wall of said opening, said detent being received in said annular recess to allow rotational adjustment of said light conducting member with respect to said cover.

19. The electrical wiring device of claim 18, wherein each said light conducting member has an inner face associated with the respective light source and an outer face with an inclined surface for projecting the light outwardly and away from said front face at an inclined angle with respect to said front face and with respect to a longitudinal axis of said light conducting member.

20. An electrical receptacle comprising;
a housing having a front face and an inner cavity, said housing having a mounting member for mounting the housing to an electrical box;

at least one light source mounted within said cavity of said housing; and at least one light conducting member extending between said light source and said front face of said housing to direct light from said light source in a selected direction outwardly and away from said housing to illuminate a target area, said at least one light conducting member being rotatably mounted for adjusting the position of the light conducting member and directing light from the light source in a selected direction.

21. The electrical wiring device of claim 20, wherein said electrical wiring device is a ground fault circuit interrupter receptacle.

22. The electrical wiring device of claim 20, wherein said front face has at least one opening for receiving said at least one light conducting member and where said at least one light conducting member has an outer face extending through said opening.

23. The electrical wiring device of claim 20, further comprising at least two of said light sources and at least two of said light conducting members, each of said light conducting members being independently adjustable with respect to said housing.

24. The electrical wiring device of claim 20, wherein said at least one light conducting member is positioned on a first side of said housing, said electrical wiring device further comprising a photo sensor positioned at a second side of said housing, said photo sensor being coupled to said at least one light source to actuate said at least one light source when ambient light is below a threshold level.

25. The electrical wiring device of claim 20, wherein said at least one light source is an LED and said at least one light conducting member is a light pipe extending between said LED and said front face of said housing.

26. The electrical wiring device of claim 20, wherein said at least one light conducting member has a side surface with an annular recess, and said front face of said housing has an opening with an inwardly extending detent received in said annular recess to couple said light conducting member to said housing and allow rotational movement of said light conducting member with respect to said housing.

* * * * *